(12) United States Patent
Yin et al.

(10) Patent No.: US 10,686,874 B2
(45) Date of Patent: Jun. 16, 2020

(54) LOAD BALANCING METHOD, APPARATUS AND SYSTEM

(71) Applicant: Huawei Technologies Co., Ltd., Shenzhen (CN)

(72) Inventors: Yue Yin, Shenzhen (CN); Shibi Huang, Shenzhen (CN); Feng Li, Shenzhen (CN); Hong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 15/282,765

(22) Filed: Sep. 30, 2016

(65) Prior Publication Data

US 2017/0026462 A1    Jan. 26, 2017

Related U.S. Application Data

(63) Continuation of application No. PCT/CN2015/073787, filed on Mar. 6, 2015.

(30) Foreign Application Priority Data

Apr. 1, 2014 (CN) .......................... 2014 1 0128730

(51) Int. Cl.
*H04L 29/08* (2006.01)
*H04L 12/64* (2006.01)
(Continued)

(52) U.S. Cl.
CPC ...... *H04L 67/1002* (2013.01); *H04L 12/6418* (2013.01); *H04L 47/70* (2013.01);
(Continued)

(58) Field of Classification Search
CPC ..... H04L 67/16; H04L 67/1002; H04L 47/70; H04L 12/6418
See application file for complete search history.

(56) References Cited

U.S. PATENT DOCUMENTS 7,606,929 B2 * 10/2009 Gbadegesin ............ H04L 29/06
709/227
8,533,308 B1 * 9/2013 Rothstein ............ H04L 67/1002
370/229
(Continued)

FOREIGN PATENT DOCUMENTS

CN        1578320 A     2/2005
CN      101304366 A    11/2008
(Continued)

OTHER PUBLICATIONS

Xia et al. "Use cases and Requirements for Virtual Service Node Pool Management". draft-xia-vsnpool-management-use-case-00. Jul. 15, 2013. pp. 1-23. (Year: 2013).*

(Continued)

*Primary Examiner* — John M Macilwinen
(74) *Attorney, Agent, or Firm* — Leydig, Voit & Mayer, Ltd.

(57) ABSTRACT

The present invention discloses a load balancing method, apparatus and system. In the present invention, a network management and control center of a basic network system interacts with a service management and control center of a network service system, and determines a load balancing policy according to entity information about service function execution entities in the network service system; and the network management and control center generates an execution flow table according to the load balancing policy, and controls a network device to perform a load balancing operation according to the execution flow table. The present invention is applicable to a network service system comprising a service function execution entity in a transparent mode, so as to implement load balancing processing on the service function execution entity in transparent mode in the network service system.

19 Claims, 9 Drawing Sheets

(51) Int. Cl.
  *H04L 12/911* (2013.01)
  *H04L 12/721* (2013.01)
  *H04L 12/803* (2013.01)
  *H04L 12/715* (2013.01)

(52) U.S. Cl.
  CPC ...... *H04L 67/1008* (2013.01); *H04L 67/1027* (2013.01); *H04L 67/1029* (2013.01); *H04L 67/16* (2013.01); *H04L 45/38* (2013.01); *H04L 45/64* (2013.01); *H04L 47/125* (2013.01)

(56) References Cited

U.S. PATENT DOCUMENTS

| | | |
|---|---|---|
| 2004/0268358 A1 | 12/2004 | Darling et al. |
| 2006/0129518 A1* | 6/2006 | Andreev .................. G06F 8/24 |
| 2007/0143460 A1* | 6/2007 | Ben-David ............ G06F 9/505 |
| | | 709/223 |
| 2008/0114781 A1 | 5/2008 | Yin et al. |
| 2008/0259797 A1 | 10/2008 | Gruper et al. |
| 2013/0070762 A1* | 3/2013 | Adams ................... H04L 49/70 |
| | | 370/389 |
| 2013/0155902 A1* | 6/2013 | Feng ................... H04L 67/1031 |
| | | 370/255 |
| 2013/0265875 A1* | 10/2013 | Dyke ................. H04L 67/1002 |
| | | 370/235 |
| 2013/0297798 A1 | 11/2013 | Arisoylu et al. |
| 2016/0308981 A1* | 10/2016 | Cortes Gomez ........ H04L 67/16 |
| 2016/0335111 A1* | 11/2016 | Bruun ................. G06F 9/45558 |

FOREIGN PATENT DOCUMENTS

| | | |
|---|---|---|
| CN | 101981560 A | 2/2011 |
| CN | 103001783 A | 3/2013 |
| EP | 1494422 A2 | 1/2005 |
| WO | WO 2013105551 A1 | 7/2013 |

OTHER PUBLICATIONS

Handigol et al., "Aster*x: Load-Balancing Web Traffic Over Wide-Area Networks," Conference Paper, XP5508068, Stanford University, Stanford, California (Nov. 2010).

* cited by examiner

LOAD BALANCING METHOD, APPARATUS AND SYSTEM

CROSS-REFERENCE TO RELATED APPLICATIONS

This application is a continuation of International Application No. PCT/CN2015/073787, filed on Mar. 6, 2015, which claims priority to Chinese Patent Application No. 201410128730.X, filed on Apr. 1, 2014. The disclosures of the aforementioned applications are hereby incorporated by reference in their entireties.

TECHNICAL FIELD

This application relates to network technical field and, in particular, to a load balancing method, apparatus and system.

BACKGROUND

By replacing special network element devices in communication networks with industrial standard-based x86 servers, storage devices and switching devices, the network function virtualization (NFV) technology can help operators to save cost and gain more network capabilities with higher flexibility, which has led to expanding applications of the NFV technology.

NFV systems offer flexible network capabilities, mainly in that they allow uniting multiple virtual network function (vNF) instances serving a same function into a vNF cluster, thus creating a logical vNF with advanced performance. In a vNF cluster, whether a load balancing is realized among multiple vNF instances providing the same function is essential for the performance of the NFV system.

In an existing load balancing method, a specialized load balancing device such as a load balancer act as a proxy to process the load balancing. Based on an specific allocation algorithm such as a randomized algorithm, a polling method or a minimum connections method, the load balancing device selects a server from a server cluster, send the server's IP address and port information to a client, to establish a connection between the server and the client, thereby performing a load balancing process for a client cluster consists of clients.

Since said load balancing method relies on a specialized load balancing device acting as a proxy to balance the load, it typically involves modifying the destination MAC address and destination IP address of a data flow, which is principally appropriate for balancing load among servers in a server cluster. However, service function execution entities in a network service system having network services at layer 2 to layer 7 (e.g. network service such as firewall, load balancer, application acceleration, network encryption/decryption, SSL gateway and VPN gateway) will inevitably include service function execution entities in transparent mode, such as a vNF in a NFV system, and service function execution entities in transparent mode do not allow modifying the destination MAC address and destination IP address of a data flow, thus, the existing load balancing method is inappropriate for balancing load among service function execution entities in a network service system.

SUMMARY

Embodiments of the present invention provide a load balancing method, apparatus and system to enable load balancing process for service function execution entities in a network service system.

The purpose of the present invention is fulfilled by the following technical solutions.

The first aspect provides a load balancing method, including:

interacting, by a network management and control center of a basic network system, with a service management and control center of a network service system, and determining a load balancing policy according to entity information about service function execution entities in the network service system;

generating, by the network management and control center, an execution flow table according to the load balancing policy, and controlling a network device to perform a load balancing operation according to the execution flow table.

With reference to the first aspect, in a first implementation, the interacting, by the network management and control center of the basic network system, with the service management and control center of the network service system, and determining the load balancing policy according to the entity information about the service function execution entities in the network service system, specifically includes:

acquiring, by the network management and control center, the entity information about the service function execution entities collected by the service management and control center, wherein the entity information includes address information, service state persistence information and load status information of each service function execution entity; and generating, by the network management and control center, a load balancing policy which includes a flow persistence suggestion and a load allocation weight suggestion and corresponds to the address information according to the service state persistence information and the load status information, wherein the flow persistence refers to sending all data flows which belong to the same service to the same service function execution entity undergoing service state persistence.

With reference to the first aspect, in a second implementation, interacting, by the network management and control center of the basic network system, with the service management and control center of the network service system, and determining the load balancing policy according to entity information about the service function execution entities in the network service system, specifically includes:

acquiring, by the network management and control center, a load balancing suggestion generated by the service management and control center based on the entity information about the service function execution entities, and taking the load balancing suggestion as the load balancing policy;

wherein the entity information includes address information, service state persistence information and load status information of each service function execution entity, the load balancing suggestion includes a flow persistence suggestion and a load allocation weight suggestion for the service function execution entity corresponding to each address, and the flow persistence refers to sending all data flows which belong to the same service to the same service function execution entity undergoing service state persistence; and taking the load balancing suggestion as the load balancing policy.

With reference to the first or second implementation of the first aspect, in a third implementation, generating, by the network management and control center, the execution flow table according to the load balancing policy, specifically includes:

generating, by the network management and control center, an execution flow table recording load allocation information and flow persistence information based on the load allocation weight suggestion and the flow persistence suggestion; and controlling the network device to perform the load balancing operation according to the execution flow table, specifically includes:

delivering, by the network management and control center, the execution flow table to a network device, to instruct the network device to perform a load allocation operation based on the load allocation information in the execution flow table, and to perform a flow persistence operation according to the flow persistence information in the execution flow table.

With reference to the third implementation of the first aspect, in a fourth implementation, generating the execution flow table recording the load allocation information and the flow persistence information, specifically includes:

generating an execution flow table recording a two-way flow allocation suggestion and a two-way flow persistence suggestion, wherein the two-way flow allocation suggestion is configured to instruct that two data flows mutually forming a two-way flow are allocated to the same service function execution entity, and the two-way flow persistence suggestion is configured to instruct that a two-way flow persistence operation is performed on the service function execution entity to which the two-way flow is allocated.

With reference to the third implementation of the first aspect, in a fifth implementation, the method further includes:

controlling, by the network management and control center, the network device to generate a flow log table recording flow allocation information and flow persistence information;

instructing, by the network management and control center, the network device to perform a load allocation operation and a flow persistence operation for a data packet from a client based on the flow log table; and instructing, by the network management and control center, the network device to swap a source address of a data packet from a server with a destination address thereof, and then perform a load allocation and a flow persistence operation according to the flow log table.

With reference to the third implementation of the first aspect, in a sixth implementation, the method further includes:

when determining that a new service function execution entity is added to a network service system, allocating, by the network management and control center, data flows other than those undergoing flow persistence operation among original service function execution entities and newly added service function execution entities according to the load allocation weight suggestion, while continuing to allocate data flows undergoing flow persistence operation to the original service function execution entities.

The second aspect provides a load balancing apparatus including a determination unit and an execution unit, wherein, the determination unit is configured to: interact with a service management and control center of a network service system, determine a load balancing policy according to entity information about service function execution entities in the network service system, and send the determined load balancing policy to the execution unit; and the execution unit is configured to: receive the load balancing policy sent by the determination unit, generate an execution flow table according to the load balancing policy, and control a network device to perform a load balancing operation according to the execution flow table.

With reference to the second aspect, in a first implementation, the determination unit is specifically configured to:

acquire the entity information about the service function execution entities collected by the service management and control center of the network service system, wherein the entity information includes address information, service state persistence information and load status information of each service function execution entity, and generate a load balancing policy including a flow persistence suggestion and a load allocation weight suggestion corresponding to the address information according to the service state persistence information and the load status information, wherein the flow persistence refers to sending all data flows which belong to the same service to the same service function execution entity undergoing service state persistence.

With reference to the second aspect, in a second implementation, the determination unit is specifically configured to:

acquire a load balancing suggestion generated by the service management and control center of the network service system based on the entity information about the service function execution entities, and take the load balancing suggestion as the load balancing policy, wherein the entity information about the service function execution entities includes address information, service state persistence information and load status information of each service function execution entity, the load balancing suggestion includes a flow persistence suggestion and a load allocation weight suggestion for the service function execution entity corresponding to each address, and the flow persistence refers to sending all data flows which belong to the same service to the same service function execution entity undergoing service state persistence.

With reference to the first or second implementation of the second aspect, in a third implementation, the execution unit is specifically configured to:

generate an execution flow table recording load allocation information and flow persistence information based on the load allocation weight suggestion and the flow persistence suggestion, deliver the execution flow table to a network device, to instruct the network device to perform a load allocation operation based on the load allocation information in the execution flow table, and to perform a flow persistence operation according to the flow persistence information in the execution flow table.

With reference to the third implementation of the second aspect, in a fourth implementation, the execution unit is specifically configured to:

generate an execution flow table recording a two-way flow allocation suggestion and a two-way flow persistence suggestion, wherein the two-way flow allocation suggestion is configured to instruct that two data flows mutually forming a two-way flow are allocated to the same service function execution entity, and the two-way flow persistence suggestion is configured to instruct that a two-way flow persistence operation is performed on the service function execution entity to which the two-way flow is allocated.

With reference to the third implementation of the second aspect, in a fifth implementation, the execution unit is further configured to:

control the network device to generate a flow log table recording flow allocation information and flow persistence information, instruct the network device to perform the load allocation operation and the flow persistence operation for a data packet from a client based on the flow log table, and instruct the network device to swap a source address of a data packet from a server with a destination address thereof, and then perform the load allocation operation and the flow persistence operation according to the flow log table.

With reference to the third implementation of the second aspect, in a sixth implementation, the determination unit is further configured to: determine whether a new service function execution entity is added to a network service system, and upon determining that the new service function execution entity is added to the network service system, send information indicating that there is a newly added service function execution entity in the network service system to the execution unit; and the execution unit is further configured to:

upon receiving the information indicating that there is a newly added service function execution entity sent by the determination unit, allocate data flows other than those undergoing flow persistence operation among original service function execution entities and the newly added service function execution entity according to the load allocation weight suggestion, while continue to allocate data flows undergoing flow persistence operation to the original service function execution entities.

The third aspect provides a load balancing system including a basic network sub-system and a network service sub-system, wherein, the basic network sub-system includes a network device and any one of the load balancing apparatuses related to in the foregoing;

the network service sub-system includes a service management and control center and at least two service function execution entities, the load balancing apparatus in the basic network sub-system interacts with the service management and control center in the network service sub-system, and determines a load balancing policy based on entity information about each of the service function execution entities in the network service sub-system, generates an execution flow table recording load allocation information and flow persistence information, and delivers the execution flow table to the network device, and the network device performs a load allocation operation for each service function execution entity in the network service sub-system based on the load allocation information, and performs a flow persistence operation for each service function execution entity in the network service sub-system based on the flow persistence information, wherein the flow persistence refers to sending all data flows which belong to the same service to the same service function execution entity undergoing service state persistence.

According to the load balancing method, apparatus and system provided in embodiments of the present invention, a load balancing policy is determined according to entity information about each of the service function execution entities in the network service system, thus allowing the load balancing policy to be determined according to the actual condition (in transparent mode or non-transparent mode) of each of the service function execution entities in the network service system. Based on the load balancing policy, an execution flow table is generated for controlling a network device to perform a load balancing operation based on the execution flow table, hence eliminating the need for any specialized load balancing device which acts as a proxy for forwarding data flow packets, thereby avoiding the modification of the destination MAC address and destination IP address of data flows in transparent mode. That is, the load balancing method provided in the present invention is applicable to network service systems that include a service function execution entity in transparent mode, and can improve the accuracy of load balancing.

DESCRIPTION OF EMBODIMENTS

Technical solutions provided in embodiments of the present invention will be described hereunder clearly and comprehensively with reference to accompanying drawings in embodiments of the present invention. Apparently, the described embodiments are only a part of embodiments of the present invention, rather than all embodiments of the present invention. All other embodiments obtained by persons skilled in the art based on the embodiments of the present invention herein without any creative effort shall fall into the protection scope of the present invention.

Figure 1:
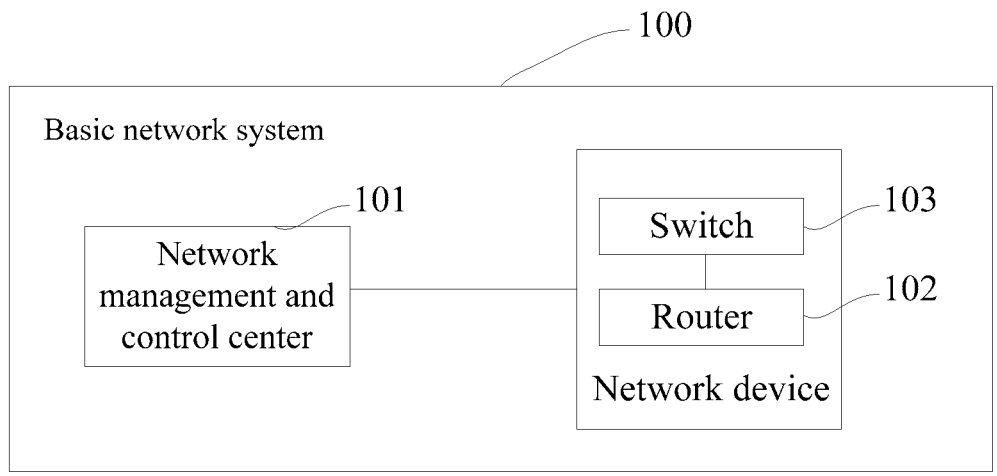
FIG. 1 is a schematic diagram of an architecture of a basic network system according to an embodiment of the present invention.

A basic network system refers to a network system configured to provide layer 2 forwarding and/or layer 3 routing services. FIG. 1 shows a system architecture diagram 100 of a basic network system. The basic network system includes various types of network devices in conventional networks, such as physical devices e.g. a router 102 and a switch 103 shown in FIG. 1, or virtual devices e.g. servers functioning as routers and switches, and further includes a network management and control center 101 configured to manage and control various types of network devices. The network management and control center 101 may be, for example, a conventional network management and control center, or a smart network management and control center, or even a software-defined networking (SDN) controller, etc., which will not be specifically defined in the embodiment of the present invention. In the basic network system, the network devices are subject to the resource management of the network management and control center 101 as managed resources. By separating the control plane of the network devices from the data plane, network traffic can be controlled flexibly, and the basic network system can provide a unified management view and programming interface for upper-layer applications, thus, in the embodiment of the present invention, the basic network system is applied to process load balancing for service function execution entities in the network service system.

Figure 2:
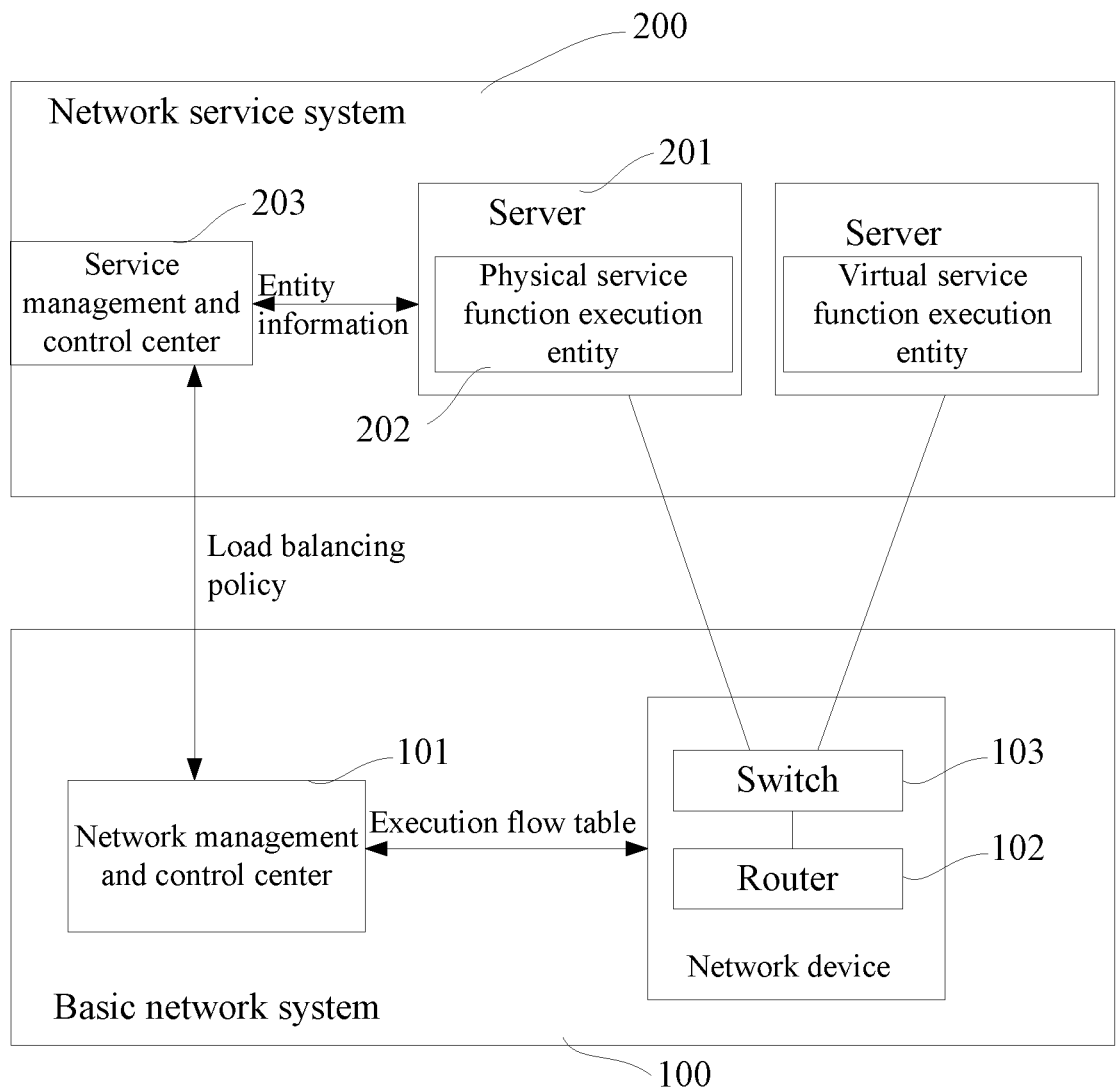
FIG. 2 is a schematic diagram of a load balancing process according to an embodiment of the present invention.

FIG. 2 is a schematic diagram showing the process of using a basic network system to implement load balancing for service function execution entities of a network service system according to an embodiment of the present invention. The network service system refers to a system having network services at layer 2 to layer 7 (e.g. the network services such as firewall, load balancer, application acceleration, network encryption/decryption, SSL gateway and VPN gateway). In an embodiment of the present invention, a service function execution entity of a network service system 200 may be a vNF instance of a NFV system, or a physical network service execution entity of a conventional network system. As shown in FIG. 2, a network service system may include several service function execution entities 202 distributed on different servers 201. The service function execution entity 202 may be configured to function as a firewall or a balancer, etc. The network service system further includes a service management and control center 203, which is configured to manage and control each service function execution entity in the network service system and exchange information with the network management and control center 101 of the basic network system so as to transfer entity information of each service function execution entity to the network management and control center 101. The network management and control center 101 can determine a load balancing policy based on entity information about each of the service function execution entities transferred by the service management and control center 203 and, based on the load balancing policy, control a network device to implement load balancing processing for each of the service function execution entities.

Figure 3:
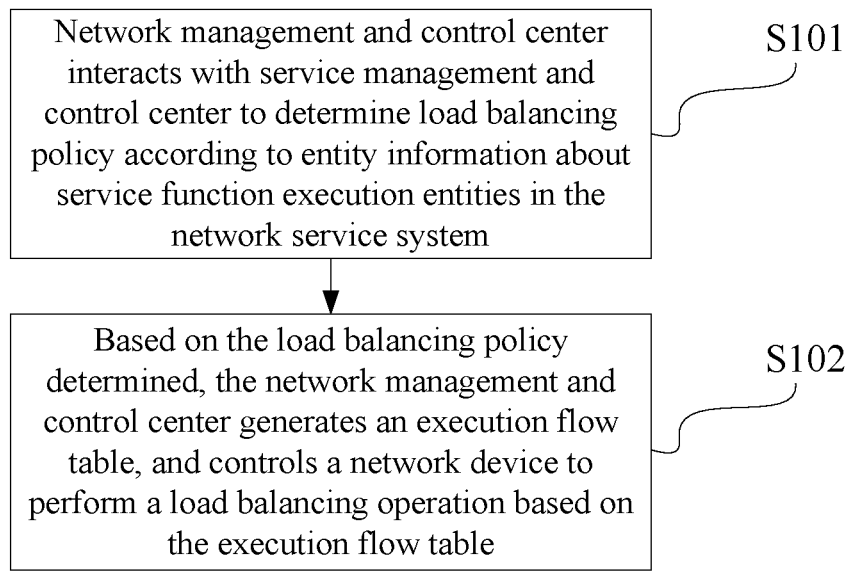
FIG. 3 is a flowchart of a method of a load balancing process according to an embodiment of the present invention.

An embodiment of the present invention will now be explained by taking a network management and control center of a basic network system performing a load balancing process as an example. FIG. 3 is a flowchart of implementing a load balancing method according to an embodiment of the present invention. As shown in FIG. 3, the method includes:

S101: a network management and control center of a basic network system interacts with a service management and control center of a network service system, and determines a load balancing policy according to entity information about service function execution entities in the network service system.

S102: based on the load balancing policy determined in S101, the network management and control center of the basic network system generates an execution flow table, and controls a network device to perform a load balancing operation based on the execution flow table.

The load balancing method provided in the embodiment of the present invention determines a load balancing policy according to entity information about each of the service function execution entities in the network service system, and determines the corresponding load balancing policy according to the actual condition (in a transparent mode or a non-transparent mode) of each of the service function execution entities in the network service system. Based on the load balancing policy, an execution flow table is generated for controlling a network device to perform a load balancing operation based on the execution flow table, hence eliminating the need for a specialized load balancing device which acts as a proxy forwarding a data flow packet, and avoiding a modification of a destination MAC address and a destination IP address of a data flow in the transparent mode. That it, the load balancing method provided in the present invention is applicable to network service systems that include service function execution entities in the transparent mode, and can improve the accuracy of load balancing.

Figure 4:
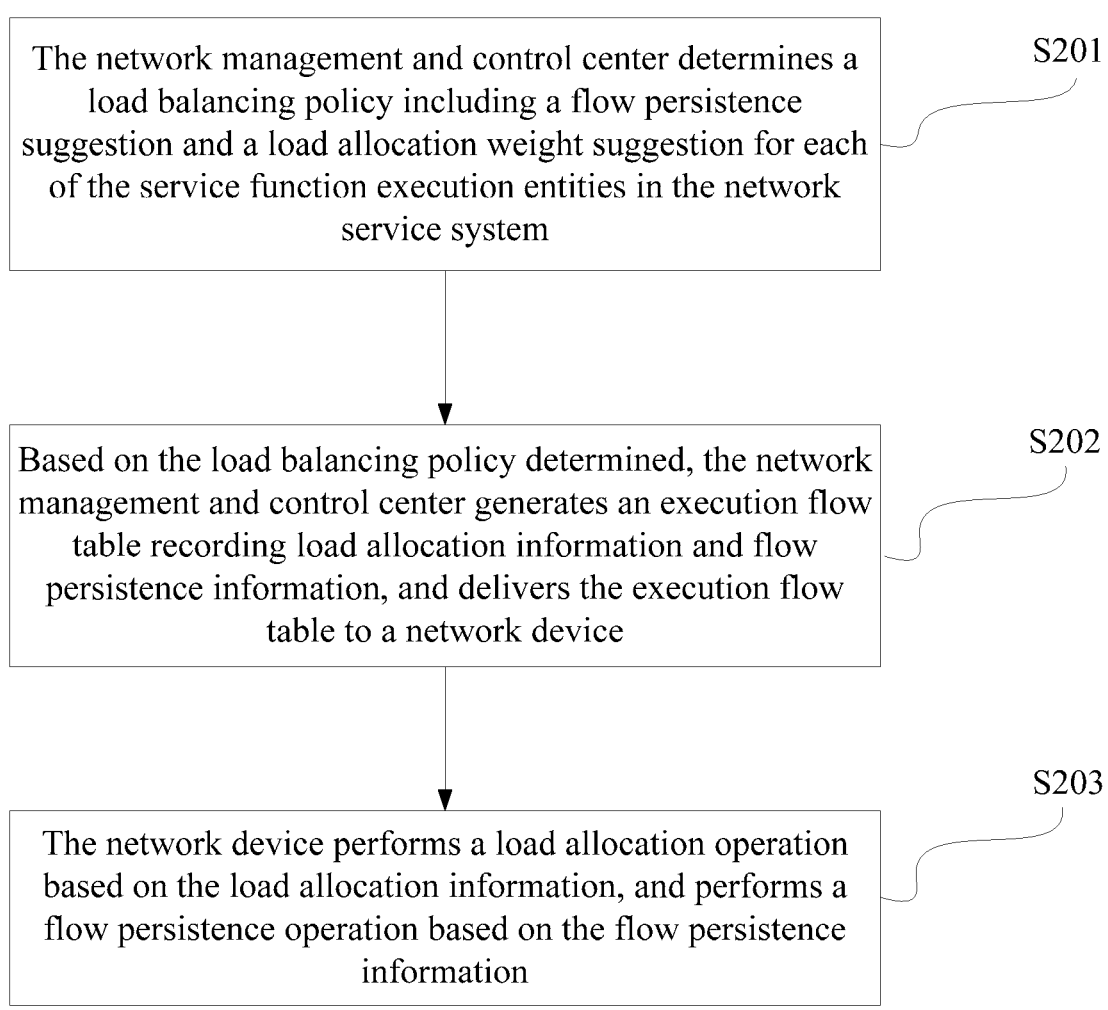
FIG. 4 is a flowchart of another method of a load balancing process according to an embodiment of the present invention.

In an embodiment of the present invention, the information acquired by the network management and control center about the service function execution entity may include service state persistence information indicating whether the service requires service state persistence, and a load status information indicating a current load condition. Thus, in an embodiment of the present invention, the procedure of processing load balancing for service function execution entities in the network service system by the basic network system may further include performing flow persistence operation for service function execution entities requiring service state persistence, that is, all data flows belonging to the same service are always sent to the same service function execution entity undergoing service state persistence for that same service. The specific procedure is carried out as shown in FIG. 4, which includes:

S201: the network management and control center of the basic network system determines a load balancing policy including a flow persistence suggestion and a load allocation weight suggestion for each of the service function execution entities of the network service system.

S202: based on the load balancing policy determined in S201, the network management and control center of the basic network system generates an execution flow table recording load allocation information and flow persistence information, and delivers the generated execution flow table to a network device.

S203: the network device performs a load allocation operation based on the load allocation information in the execution flow table generated in S202, and performs a flow persistence operation based on the flow persistence information in the execution flow table.

Specifically, rather than using a specialized load balancing device acting as a proxy to balance the load, in the embodiment of the present invention, the network device of the basic network system performs the load allocation operation based on the load allocation information in the execution flow table and the flow persistence operation based on the flow persistence information in the execution flow table, thereby ensuring that a destination MAC address and a destination IP address of a data flow packet are not modified. For example, when the load balancing policy aims at a load balancing operation for a service function execution entity in transparent mode, a network device may add a temporary IP address to a data flow packet in the execution flow table and send the packet to the service function execution entity, and recover the original data flow packet from the data flow packet by removing the temporary IP address after the data flow packet is returned by the service function execution entity. In the embodiment of the present invention, the network device of the basic network system performs the load allocation operation and the flow persistence operation, which can ensure that no modification is made to the data flow packet of the service function execution entity in the transparent mode, and is suitable for the load balancing processing of service function execution entities in the transparent mode.

The load balancing method provided in the embodiment of the present invention determines a load balancing policy including a flow persistence suggestion and a load allocation weight suggestion for each of the service function execution entities of the network service system; based on the load balancing policy, generates an execution flow table recording load allocation information and flow persistence information; and performs the load allocation operation based on the load allocation information and the flow persistence operation based on the flow persistence information. That is, in the embodiment of the present invention, the flow persistence processing is performed while the load balancing processing is performed, thus further improving the accuracy of the load balancing processing.

In S201 of the embodiment of the present invention, the load balancing policy can be determined by any of the following modes:

First mode: the network management and control center acquires entity information about service function execution entities including address information, service state persistence information and load status information of each service function execution entity; and then based on the acquired service state persistence information and the load status information of each service function execution entity, the network management and control center generates a load balancing policy corresponding to the acquired address information and including a flow persistence suggestion and a load allocation weight suggestion.

Specifically, in an embodiment of the present invention, the entity information about the service function execution entities may either be acquired directly by the network management and control center, or be transferred to the network management and control center after being collected by the service management and control center of the network service system. In an embodiment of the present invention, the entity information about the service function execution entities is preferably collected by the service management and control center of the network service system so as to reduce the burden on the network management and control center, hence improving the load balancing process capacity.

Second mode: the network management and control center acquires a load balancing suggestion which is generated by the network service system based on the entity information about the service function execution entities, and takes the load balancing suggestion as the load balancing policy.

Specifically, the service management and control center of the network service system collects, in real time, entity information about service function execution entities including address information, service state persistence information and load status information of each service function execution entity, and based on the entity information about the service function execution entities, generates a load balancing suggestion including a flow persistence suggestion and a load allocation weight suggestion of the service function execution entity corresponding to each address; send the load balancing suggestion to the network management and control center, thereby reducing the burden on the network management and control center.

Figure 5:
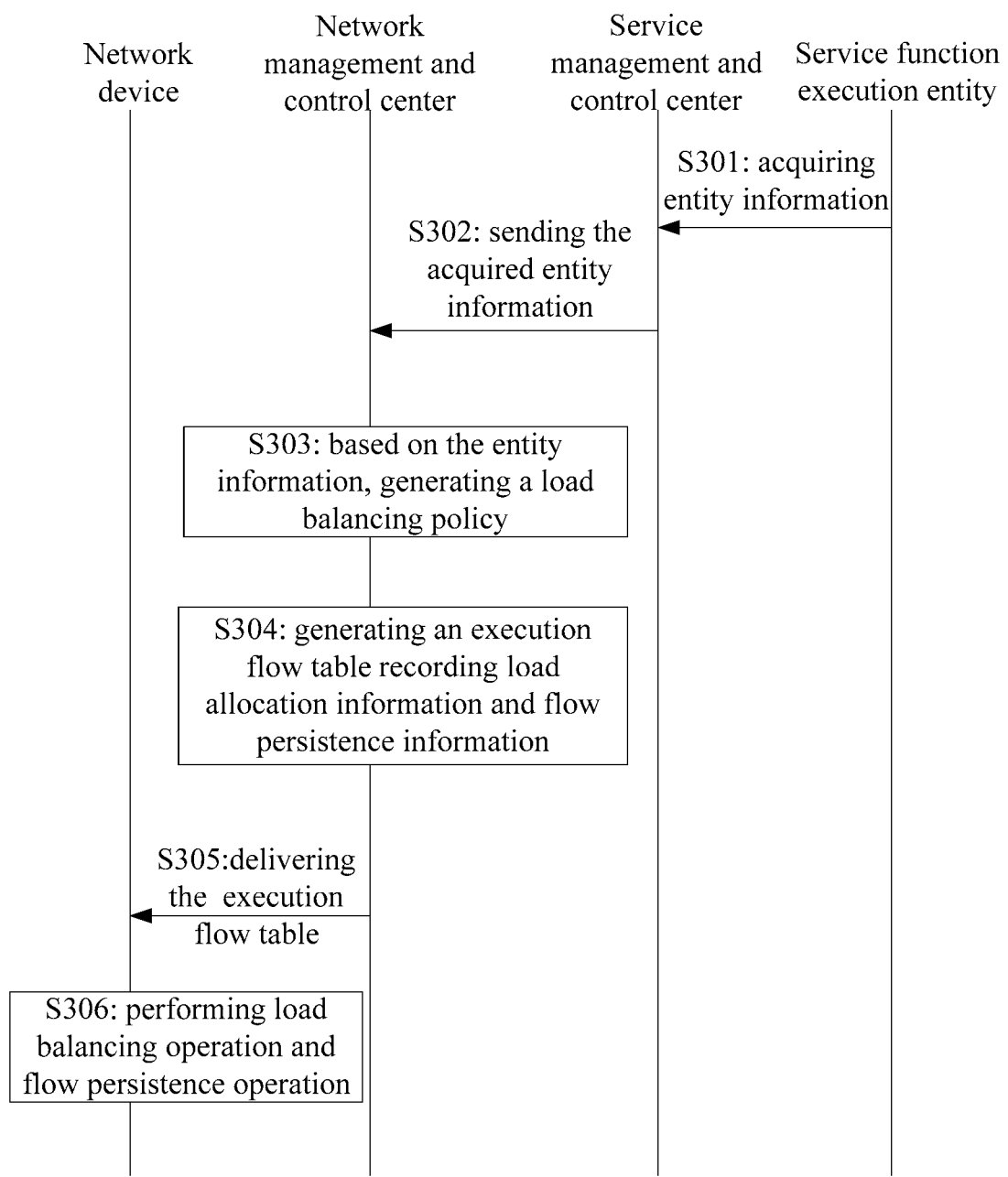
FIG. 5 is a flowchart of an implementation of a load balancing process according to an embodiment of the present invention.

When determining the load balancing policy using the first mode, the procedure of enabling load balancing by causing the service management and control center to acquire the entity information about the service function execution entities and transfer the same to the network management and control center is shown in FIG. 5, and the procedure particularly includes:

S301: the service management and control center acquires entity information about the service function execution entities.

Specifically, the entity information about the service function execution entities acquired by the service management and control center in the embodiment of the present invention may be category information about the service function execution entity, address information and identity information about the service function execution entities which indicate destination of data traffic allocation, service state persistence information indicating whether service state persistence is required, and load status information indicating a current load condition.

S302: the service management and control center sends the acquired entity information about the service function execution entities to the network management and control center.

S303: based on the entity information about the service function execution entities sent by the service management and control center, the network management and control center generates a load balancing policy.

Specifically, the load balancing policy generated by the network management and control center in the embodiment of the present invention includes at least address information and identity information about the service function execution entities, and a flow persistence suggestion and a load allocation weight suggestion for the service function execution entity. The address information and identity information about the service function execution entities may be configured to indicate the destination of the data traffic allocation when the load allocation is performed. The flow persistence suggestion for the service function execution entity is configured to indicate whether flow persistence is required for a service function execution entity corresponding to each address, and when the acquired service state persistence information about the service function execution entity indicates that a service requires service state persistence, the flow persistence suggestion is performing the flow persistence, otherwise no flow persistence will be performed. The load allocation weight suggestion is configured to indicate a weight ratio of the data traffic to be allocated to each service function execution entity. When a service function execution entity currently has a lower load, an assigned data traffic weight will be large, and when the service function execution entity currently has a larger load, the assigned data traffic weight will be small, so that the load is allocated in a balanced manner.

S304: based on the load balancing policy generated in S303, the network management and control center generates an execution flow table recording the load allocation information and the flow persistence information.

S305: the network management and control center delivers the generated execution flow table recording the load allocation information and the flow persistence information to a network device, to instruct the network device to perform load balancing operation and flow persistence operation based on the execution flow table.

S306: based on the execution flow table received, the network device performs the load balancing operation and the flow persistence operation.

Figure 6:
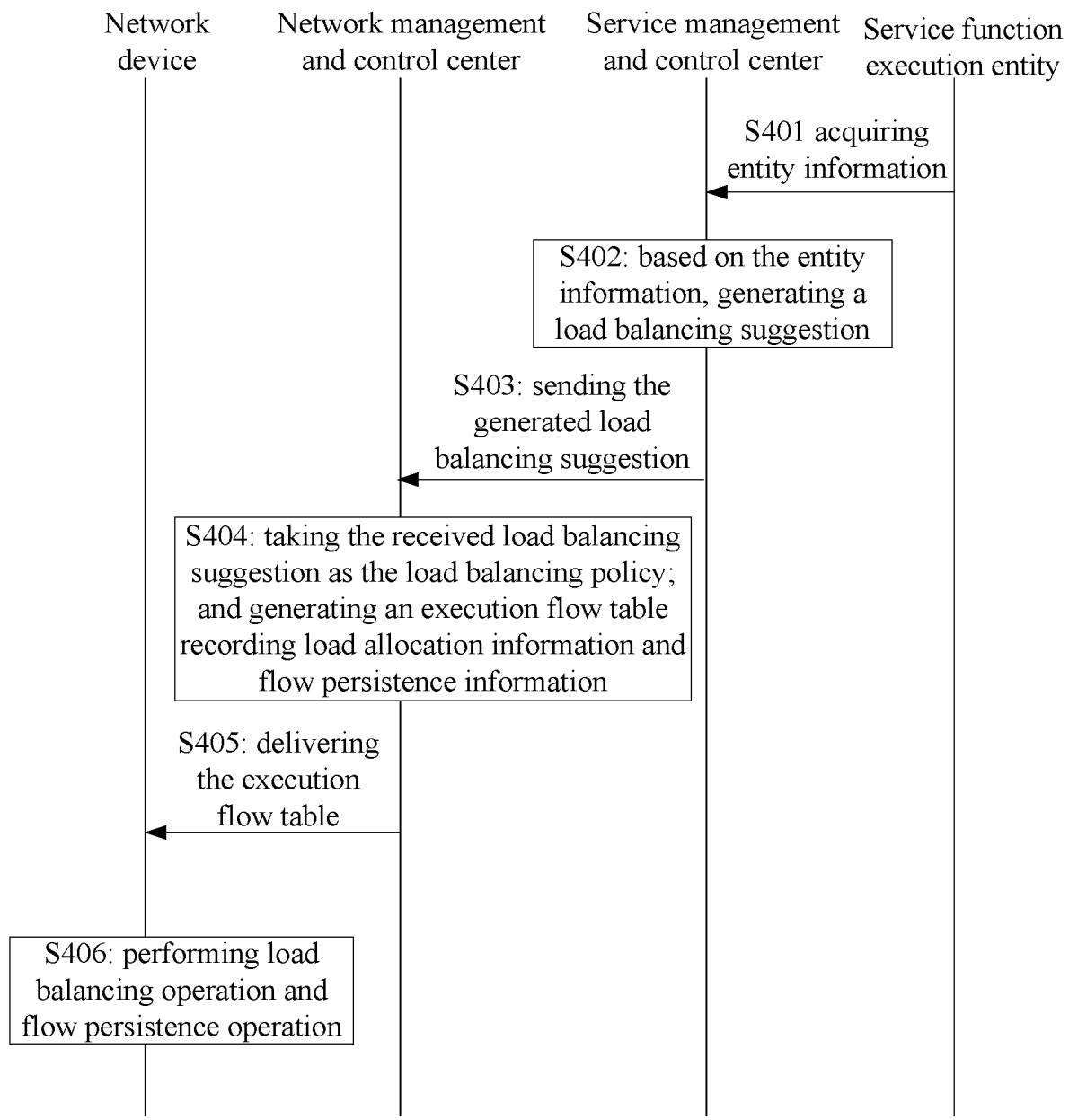
FIG. 6 is a flowchart of another implementation of a load balancing process according to an embodiment of the present invention.

When determining the load balancing policy using said second mode, the procedure of enabling load balancing is shown in FIG. 6, and the procedure particularly includes:

S401: the service management and control center acquires entity information about the service function execution entities.

Specifically, the entity information about the service function execution entities acquired by the service management and control center in the embodiment of the present invention may be category information about the service function execution entity, address information and identity information about the service function execution entities which indicate destination of data traffic allocation, service state persistence information indicating whether service state persistence is required, and load status information indicating a current load condition.

S402: based on the entity information about the service function execution entities acquired, the service management and control center generates a load balancing suggestion.

In particular, the load balancing suggestion generated by the service management and control center in the embodiment of the present invention includes at least the address information and the identity information about the service function execution entities, and a flow persistence suggestion and a load allocation weight suggestion for the service function execution entity. The address information and identity information about the service function execution entities may be configured to indicate the destination of the data traffic allocation when the load allocation is performed. The flow persistence suggestion for the service function execution entity is configured to indicate whether flow persistence is required for a service function execution entity corresponding to each address, and when the acquired service state persistence information about the service function execution entity indicates that a service requires service state persistence, the flow persistence suggestion is performing the flow persistence, otherwise no flow persistence will be performed. The load allocation weight suggestion is configured to indicate a weight ratio of the data traffic to be allocated to each service function execution entity. When a service function execution entity currently has a lower load, an assigned data traffic weight will be large, and when the service function execution entity currently has a larger load, the assigned data traffic weight will be small, so that the load is allocated in a balanced manner.

S403: the service management and control center sends the generated load balancing suggestion to the network management and control center.

S404: the network management and control center takes the received load balancing suggestion as the load balancing policy; and based on the load balancing policy, generates an execution flow table recording the load allocation information and the flow persistence information.

S405: the network management and control center delivers the generated execution flow table recording the load allocation information and the flow persistence information to a network device, to instruct the network device to perform load balancing operation and flow persistence operation based on the execution flow table.

S406: based on the execution flow table received, the network device performs the load balancing operation and the flow persistence operation.

In the above mentioned two implementation modes for the load balancing policy of the embodiment of the present invention, the flexibility of selecting either the basic network system side or the network service system side to generate the load balancing policy can be provided, depending on the processing power of the basic network system and the network service system.

Now the procedures of load balancing process involved in the foregoing embodiments of the present invention will be explained with reference to specific applications.

The embodiment of the present invention will be explained by way of example referring to a network service system embodied as a NFV system.

Figure 7:
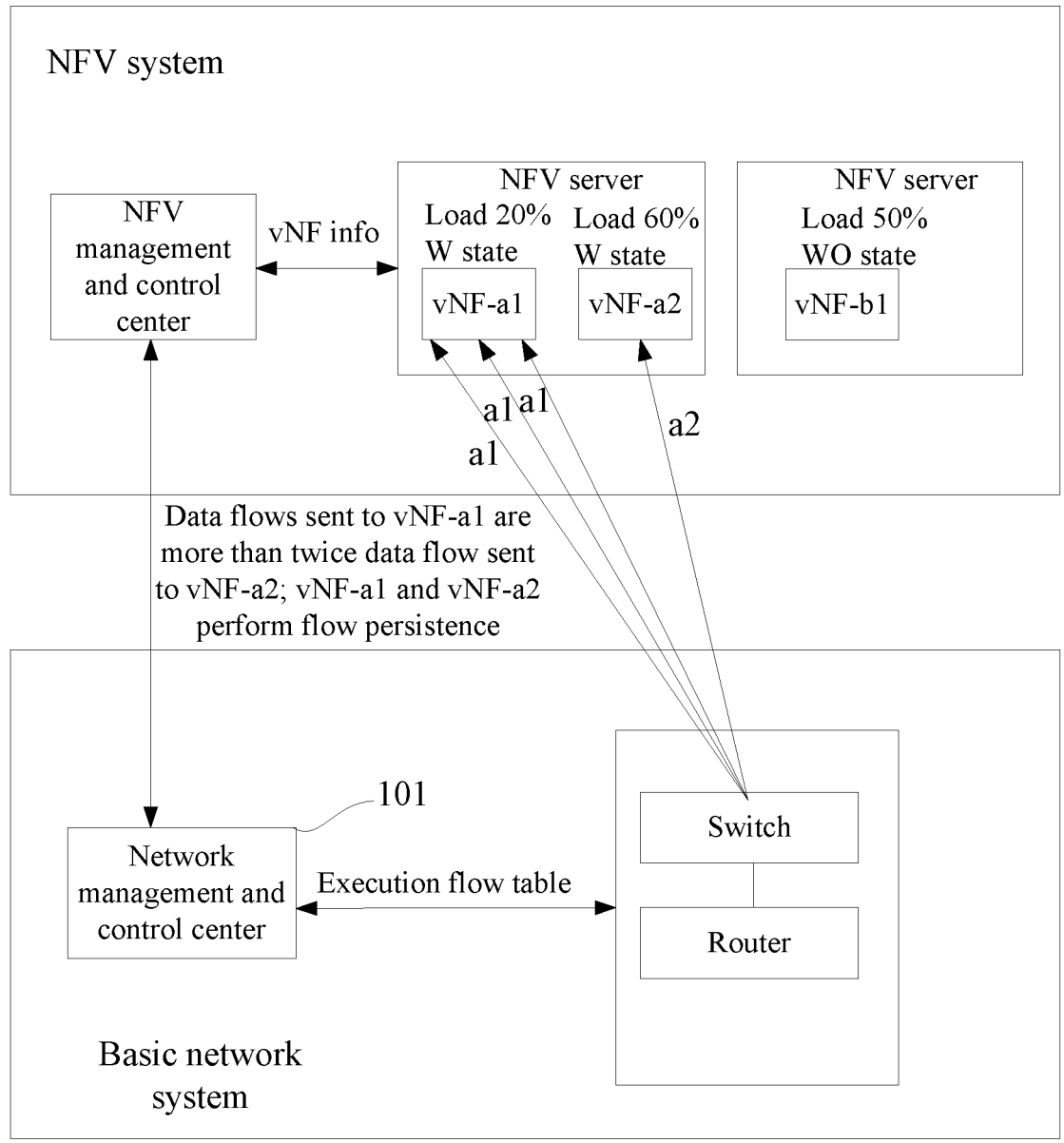
FIG. 7 is a schematic diagram of a procedure of a load balancing process according to an embodiment of the present invention.

FIG. 7 shows a schematic diagram of a procedure of a load balancing process for a NFV system according to an embodiment of the present invention.

In FIG. 7, the NFV system includes a NFV management and control center, two NFV servers, and a vNF-a1, a vNF-a2 and a vNF-b1 located on the NFV servers. The basic network system includes a network management and control center and a network device, where the network device includes in essence a switch and a router.

In the embodiment of the present invention, the vNF entity information acquired by the NFV management and control center is shown in Table 1 below:

TABLE 1

| Identity | Address | Type | Service load | With or without State |
|---|---|---|---|---|
| vNF-a1 | MAC-a1 | Balancer | 20% | with |
| vNF-a2 | MAC-a2 | Balancer | 60% | with |
| vNF-b1 | MAC-b1 | Firewall | 50% | without |

In the embodiment of the present invention, the load balancing policy generated by either the NFV management and control center or the network management and control center based on the vNF entity information shown in Table 1 may be as shown in Table 2:

TABLE 2

| Identity | Address | Type | Load weight | Flow persistence |
|---|---|---|---|---|
| vNF-a1 | MAC-a1 | Balancer | 3 | Yes |
| vNF-a2 | MAC-a2 | Balancer | 1 | Yes |
| vNF-b1 | MAC-b1 | Firewall | 0 | No |

In the embodiment of the present invention, the vNF-a1 is at a current load level of 20%, the lowest among the vNF-a1, vNF-a2 and vNF-b1. Hence the largest weight ratio of the data traffic is assigned to vNF-a1 when determining the load balancing policy and performing the load weight allocation. Meanwhile, vNF-a1 needs the flow persistence operation because vNF-a1 is with a state. The vNF-a2 is at a current load level of 60%, the highest among the vNF-a1, vNF-a2 and vNF-b1. Hence vNF-a2 is assigned with the smallest weight ratio of the data traffic, and also needs the flow persistence operation. As for vNF-b1, a current load level of 50% indicates that no data traffic is allocated thereto, and since no service needs the state persistence, no flow persistence operation needs to be performed.

After determining the load balancing policy, the network management and control center can generate the execution flow table as shown in Table 3 below. The execution flow table includes data flow identity, next hop address allocated to the data flow, and flow persistence information indicating whether flow persistence operation is needed:

TABLE 3

| Data flow identity | Next hop address allocated for the data flow | Flow persistence |
|---|---|---|
| Data flow with a destination IP of XX6 | send to MAC-a1 | Yes |
| Data flow with a destination IP of XX7 | send to MAC-a1 | Yes |
| Data flow with a destination IP of XX8 | send to MAC-a1 | Yes |
| Data flow with a destination IP of XX2 | send to MAC-a2 | Yes |
| Data flow with a destination IP of X10 | send to MAC-b1 | No |

According to the execution flow table generated by the network management and control center in the embodiment of the present invention, all data flows with destination IP addresses of XX6, XX7 and XX8 are sent to the vNF-a1 at MAC-a1, all data flows with a destination IP address of XX2 are sent to the vNF-a2 at MAC-a2, and all data flows with a destination IP address of X10 are sent to the vNF-b1 at MAC-b1, resulting that data flows sent to vNF-a1 are more than twice those sent to vNF-a2, thereby the load balance among vNF-a1, vNF-a2 and vNF-b1 is realized.

The execution flow table generated by the network management and control center in the embodiment of the present invention is delivered to a network device, and the network device performs a corresponding load balancing operation and a flow persistence operation based on the execution flow table, thereby enabling load balancing without the need for any specialized load balancing device.

In the embodiment of the present invention, the network device performs the load balancing operation based on the execution flow table, so that data flows (shown as lines a1 in FIG. 7) allocated to vNF-a1 are more than twice those (shown as line a2 in FIG. 7) allocated to vNF-a2.

In an embodiment of the present invention, the network management and control center may further control the network device to generate a flow log table recording flow allocation information and flow persistence information and to perform subsequent load allocation and flow persistence operation based on the flow log table. In an embodiment of the present invention, the network device may store data flows sent to vNF-a1 and vNF-a2 in the form of the flow log table as shown in Table 4:

TABLE 4

| Data flow identity | Next hop address allocated for the data flow |
|---|---|
| Source IP = Y1 Destination IP = XX6 | send to MAC-a1 |
| Source IP = Y2 Destination IP = XX6 | send to MAC-a1 |
| Source IP = Y7 Destination IP = XX7 | send to MAC-a1 |
| Source IP = Y1 Destination IP = XX2 | send to MAC-a2 |

According to the load balancing method provided in the embodiment of the present invention, the network management and control center or the NFV management and control center determines a load balancing policy including a flow persistence suggestion and a load allocation weight suggestion for each vNF instance of the NFV system. Based on the load balancing policy, the network management and control center generates an execution flow table recording the load allocation information and the flow persistence information, and delivers the execution flow table to a network device. The network device performs the load balancing operation and the flow persistence operation without the need for any specialized load balancing device, which simplifies the implementation process of load balancing. Additionally, in the embodiment of the present invention, the flow persistence process is performed while the load balancing process is performed, which ensures no disruption is made to the NFV system's vNFs in transparent mode, thereby enabling load balancing without disrupting any vNF in transparent mode in the NFV system.

Figure 8:
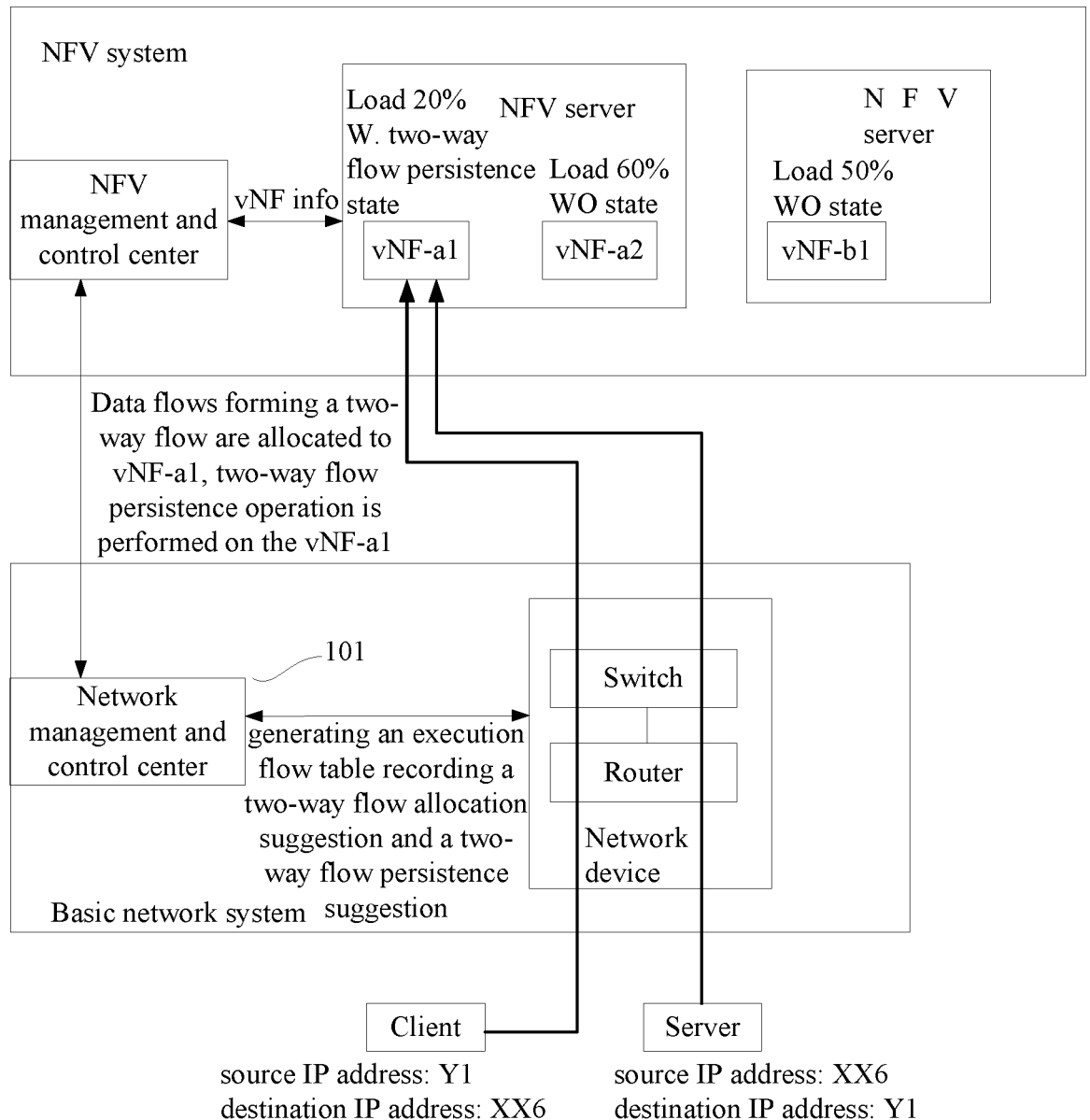
FIG. 8 is a schematic diagram of a procedure of a load balancing process enabling two-way flow persistence according to an embodiment of the present invention.

FIG. 8 is a schematic diagram showing a load balancing process for vNFs in a NFV system in another application scenario according to an embodiment of the present invention. In FIG. 8, the client requests a network service using a source IP address of Y1 and a destination IP address of XX6, while the server requests a network service using a source IP address of XX6 and a destination IP address of Y1. Since the client side will have the same source IP and destination IP as the server side if the client's source IP and destination IP are swapped, that is, these data flows from the client and server mutually form a two-way flow. Accordingly, an embodiment of the present invention provides a load balancing method for allocating two data flows mutually forming a two-way flow to the same vNF instance so that the quality of user access is improved.

In a preferred example of embodiments of the present invention, a network management and control center generates an execution flow table recording a two-way flow allocation suggestion and a two-way flow persistence operation, and a network device implements the execution flow table so that two data flows mutually forming a two-way flow are allocated to the same service function execution entity (vNF instance).

Specifically, when the network management and control center determines that a two-way flow persistence operation is needed based on vNF entity information feedback by the NFV system, the network management and control center generates an execution flow table recording a two-way flow allocation suggestion and a two-way flow persistence suggestion based on vNF instance information acquired by the NFV management and control center, and enables traffic allocation in which all data flows are identified as two-way data flows using the two-way flow allocation suggestion, two data flows mutually forming a two-way flow are allocated to the same vNF instance, and the two-way flow persistence operation is performed on the vNF instance to which a two-way flow is allocated by means of the two-way flow persistence suggestion. The execution flow table generated by the network management and control center in the embodiment of the present invention may be as shown in Table 5 below:

TABLE 5

| Data flow identity | Next hop address allocated for the data flow | Flow persistence |
|---|---|---|
| Source IP = Y1 Destination IP = XX61 | send to MAC-a1 | Yes |
| Source IP = XX6 Destination IP = Y1 | send to MAC-a1 | Yes |

In the embodiment of the present invention, the network management and control center generates an execution flow table recording a two-way flow allocation suggestion and a two-way flow persistence suggestion as shown in Table 5 and delivers the execution flow table to a network device, so that the network device can perform, based on the execution flow table, load balancing process which involves two-way flow allocation and two-way flow persistence.

In another preferred example of embodiments of the present invention, two data flows mutually forming a two-way flow may be allocated to the same vNF instance by a network device.

Specifically, in the embodiment of the present invention, a network device of a basic network system may perform the load balancing operation and flow persistence operation based on an execution flow table. Accordingly, when the network management and control center determines that a two-way flow persistence operation is needed based on vNF entity information feedback by the NFV system, the network management and control center may generate an execution flow table as shown in FIG. 6 below:

TABLE 6

| Data flow identity | Next hop address allocated for the data flow | Flow persistence | Two-way flow |
|---|---|---|---|
| Source IP = Y1 Destination IP = XX6 | send to MAC-a1 | Yes | Yes |

The network management and control center delivers the execution flow table shown in Table 6 to a network device, so that the network device directly allocates a data flow whose source IP=Y1 and destination IP=XX6 to the vNF-a1 whose address is MAC-a1 based on the execution flow table; identify the data flow whose source IP=Y1 and destination IP=XX6 as a two-way flow based on the execution flow table, and correspondingly allocate another data flow whose source IP=XX6 and destination IP=Y1 to the same vNF-a1 whose address is MAC-a1 because these two data flows mutually form a two-way flow; and generates a flow log table as shown in Table 7:

TABLE 7

| Data flow identity | Next hop address allocated for the data flow |
|---|---|
| Source IP = Y1 Destination IP = XX6 | send to MAC-a1 |
| Source IP = XX6 Destination IP = Y1 | send to MAC-a1 |

Hence in the embodiment of the present invention, future load allocations can be performed according to the flow log table shown in Table 7.

In the present invention, the network device may also carry out the two-way flow allocation procedure in the following preferred mode: for a data packet from a client, performing the load allocation operation and flow persistence operation based on the generated flow log table; for a data packet from a server, swapping its source address with its destination address, then performing the load allocation operation and flow persistence operation based on the generated flow log table, thereby reducing the number of table items that need to be generated.

Specifically, the embodiment of the present invention will now be explained by way of example using the flow log table shown in Table 8:

TABLE 8

| Data flow identity | Next hop address allocated for the data flow |
|---|---|
| Source IP = Y1 Destination IP = XX6 | send to MAC-a1 |

The network management and control center delivers control instructions of two-way flow allocation and two-way flow persistence to a network device, causing the network device to initiate its two-way flow persistence function. For a data flow whose source IP=Y1 and destination IP=XX6 from a client side, the network device directly performs load allocation operation based on the flow log table and allocates the flow to vNF-a1 whose address is MAC-a1; for a data flow whose source IP=XX6 and destination IP=Y1 from a server side, swaps its source address and destination address, and thus the source IP=Y1 and destination IP=XX6, thereby the data flow whose source IP=XX6 and destination IP=Y1 is also allocated to the vNF-a1 whose address is MAC-a1 according to the flow log table shown in Table 8.

As shown in FIG. 8, the network device allocates both data flows from the client side and the server side to the same vNF-a1 whose address is MAC-a1 based on the execution flow table shown in Table 5 which records a two-way flow allocation suggestion and a two-way flow persistence suggestion and is delivered from the network management and control center, thus realizing a two-way flow persistence.

In yet another embodiment of the present invention, a load balancing process procedure to be carried out when a new service function execution entity is added to the network service system is explained.

In the embodiment of the present invention, when the network management and control center determines that a new service function execution entity is added to the network service system, destination addresses allocated to data flows undergoing flow persistence operation remain unchanged, and data flows other than those undergoing flow persistence operation are allocated among original service function execution entities and a newly added service function execution entity according to the load allocation weight suggestion.

The embodiment of the present invention will be explained by the following example which illustrates a load balancing allocation procedure when a new vNF instance is added to a NFV system.

Figure 9:
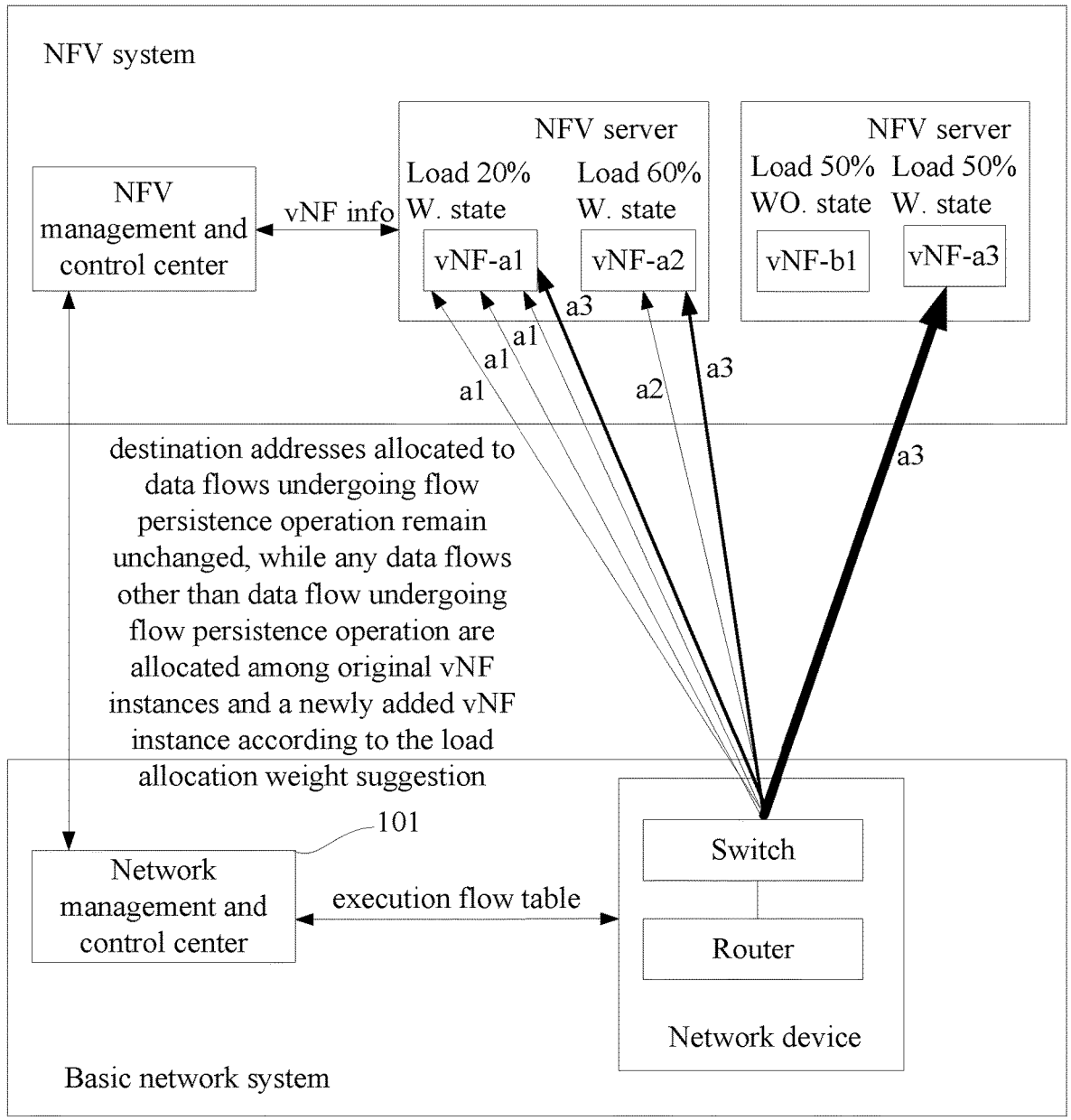
FIG. 9 is a schematic diagram of a procedure of realizing load balancing process based on a newly added service function execution entity according to an embodiment of the present invention.

FIG. 9 is a schematic diagram of the load balancing allocation procedure when a new vNF instance is added to a NFV system according to an embodiment of the present invention.

As shown in FIG. 9, the vNF-a3 is the new service function execution entity added to the NFV system, while vNF-a1, vNF-a2 and vNF-b1 are original service function execution entities. The load status and flow persistence state of each service function execution entity are shown in Table 9:

TABLE 9

| Identity | Address | Type | Service load | With or without State |
|---|---|---|---|---|
| vNF-a1 | MAC-a1 | Balancer | 20% | with |
| vNF-a2 | MAC-a2 | Balancer | 60% | with |
| vNF-b1 | MAC-b1 | Firewall | 50% | without |
| vNF-a3 | MAC-a3 | Balancer | 5% | with |

Based on the load status and flow persistence state information of each vNF instance shown in Table 9, the network management and control center determines the load balancing policy shown in Table 10:

TABLE 10

| Identity | Address | Type | Load weight | With or without State |
|---|---|---|---|---|
| vNF-a1 | MAC-a1 | Balancer | 1 | with |
| vNF-a2 | MAC-a2 | Balancer | 1 | with |
| vNF-b1 | MAC-b1 | Firewall | 0 | without |
| vNF-a3 | MAC-a3 | Balancer | 10 | with |

The embodiment of the present invention will now be explained by referring to the data flow undergoing flow persistence shown in Table 3 and FIG. 7. In the embodiment of the present invention, destination addresses allocated to data flows undergoing flow persistence operation for their vNFs remain unchanged. That is, data flows whose destination IP addresses are XX6-XX8 remain being allocated to vNF-a1 whose address is MAC-a1, and data flow whose destination IP address is XX2 remains being allocated to vNF-a2 whose address is MAC-a2. Meanwhile, data flows whose destination IP addresses are X11-X20, X21 and X22 are new added data flows, and are allocated among vNF-a1, vNF-a2 and vNF-a3 based on the load allocation weight suggestion shown in Table 10, leading to the execution flow table shown in Table 11:

TABLE 11

| Data flow | Next hop address allocated for the data flow | Flow persistence |
|---|---|---|
| Data flows with a destination IP of XX6-XX8 | send to MAC-a1 | Yes |
| Data flow with a destination IP of XX2 | send to MAC-a2 | Yes |
| Data flows with a destination IP of X11-X20 | send to MAC-a3 | Yes |
| Data flow with a destination IP of X21 | send to MAC-a1 | Yes |
| Data flow with a destination IP of X22 | send to MAC-a2 | Yes |

In the embodiment of the present invention, the network management and control center generates an execution flow table and delivers the execution flow table to a network device, and the network device performs corresponding load allocation operation and flow persistence operation based on the execution flow table. In the embodiment of the present invention, the network device performs load balancing operation based on the execution flow table, and data flows allocated to vNF-a1 (shown as line a1 in FIG. 9) and data flows allocated vNF-a2 (shown as line a2 in FIG. 9) remain unchanged, while the new added data flows are allocated among vNF-a1, vNF-a2 and vNF-a3 (shown as line a3 in FIG. 9) according to the load allocation weight suggestion.

According to the load balancing method provided in the embodiment of the present invention, when a new vNF instance is added to the NFV system, destination addresses allocated to data flows undergoing flow persistence operation remain unchanged, while other data flows other than data flows undergoing flow persistence operation are allocated among original vNF instances and a newly added vNF instance according to the load allocation weight suggestion, which can perform the flow persistence operation for the data flows which need perform the flow persistence operation, and enable load balancing allocation among all vNF instances on the basis of persisting with the flow operation.

Figure 10:
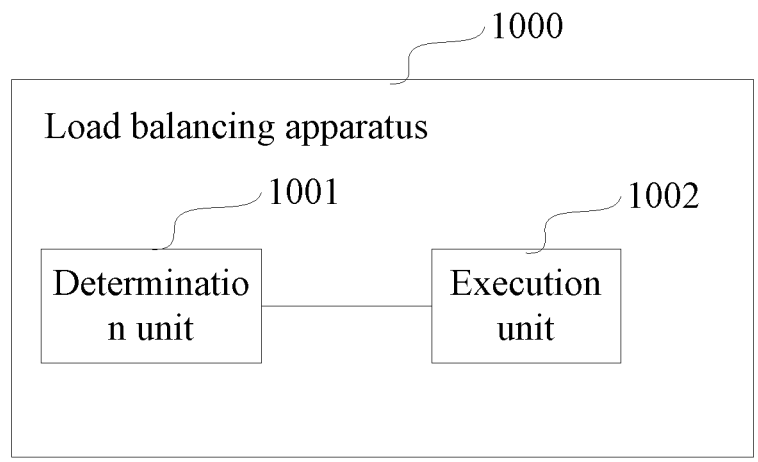
FIG. 10 is a schematic structural diagram of a load balancing apparatus according to an embodiment of the present invention.

Based on the load balancing method provided in the above embodiments, an embodiment of the present invention further provides a load balancing apparatus 1000. As shown in FIG. 10, the load balancing apparatus includes a determination unit 1001 and an execution unit 1002, wherein:

the determination unit 1001 is configured to interact with a service management and control center of a network service system, determine a load balancing policy according to entity information about service function execution entities in the network service system, and send the load balancing policy thus determined to the execution unit 1002;

the execution unit 1002 is configured to receive the load balancing policy sent by the determination unit 1001, generate an execution flow table according to the load balancing policy, and control a network device to perform a load balancing operation based on the execution flow table.

With reference to the load balancing apparatus provided hereinabove, in a first implementation mode, the determination unit 1001 is specifically configured to:

acquire the entity information about the service function execution entities, wherein the entity information about the service function execution entities includes the service function execution entity's address information, service state persistence information and load status information, generate a load balancing policy corresponding to the address information according to the service state persistence information and the load status information, wherein the load balancing policy includes a flow persistence suggestion and a load allocation weight suggestion, Specifically, the determination unit 1001 can acquire entity information about each service function execution entity collected by the service management and control center of the network service system.

With reference to the load balancing apparatus provided hereinabove, in a second implementation, the determination unit 1001 is specifically configured to:

acquire a load balancing suggestion generated by the network service system based on the entity information about the service function execution entities, and determine the load balancing suggestion as the load balancing policy.

In the embodiment of the present invention, the entity information about the service function execution entities includes the service function execution entity's address information, service state persistence information and load status information, and the load balancing suggestion includes a flow persistence suggestion and a load allocation weight suggestion for the service function execution entity corresponding to each address.

In combination with the load balancing apparatus provided in the first implementation or second implementation, in a third implementation mode, the execution unit 1002 is specifically configured to:

generate an execution flow table recording load allocation information and flow persistence information based on the load allocation weight suggestion and the flow persistence suggestion, deliver the execution flow table to a network device, to instruct the network device to perform a load allocation operation based on the load allocation information in the execution flow table, and to perform a flow persistence operation according to the flow persistence information in the execution flow table.

Specifically, the execution unit 1002 is specifically configured to:

generate an execution flow table recording a two-way flow allocation suggestion and a two-way flow persistence suggestion, wherein the two-way flow allocation suggestion is configured to instruct that two data flows mutually forming a two-way flow are allocated to the same service function execution entity, and the two-way flow persistence suggestion is configured to instruct that a two-way flow persistence operation is performed on the service function execution entity to which the two-way flow is allocated.

Additionally, the execution unit 1002 is further configured to:

control the network device to generate a flow log table recording flow allocation information and flow persistence information, and instruct the network device to perform load allocation operation and flow persistence operation according to the flow log table.

Wherein, the execution unit 1002 is specifically configured to:

instruct the network device to perform for a data packet from a client the load allocation operation and flow persistence operation based on the flow log table; instruct the network device to swap, for a data packet from a server, its source address with destination address, and perform the load allocation operation and flow persistence operation based on the flow log table.

Additionally, the determination unit 1001 is further configured to determine whether a new service function execution entity is added to a network service system, and when it is determined that a new added service function execution entity exists in the network service system, send information to the execution unit 1002 indicating that a new service function execution entity is added in the network service system.

Wherein, the execution unit 1002 is further configured to:

upon receiving the information sent by the determination unit 1001 indicating that a new service function execution entity is added, allocate data flows other than those undergoing flow persistence operation among original function execution entities and a newly added service function execution entity according to the load allocation weight suggestion, while the service function execution entities to allocated to data flows undergoing flow persistence operation remain unchanged.

Figure 11:
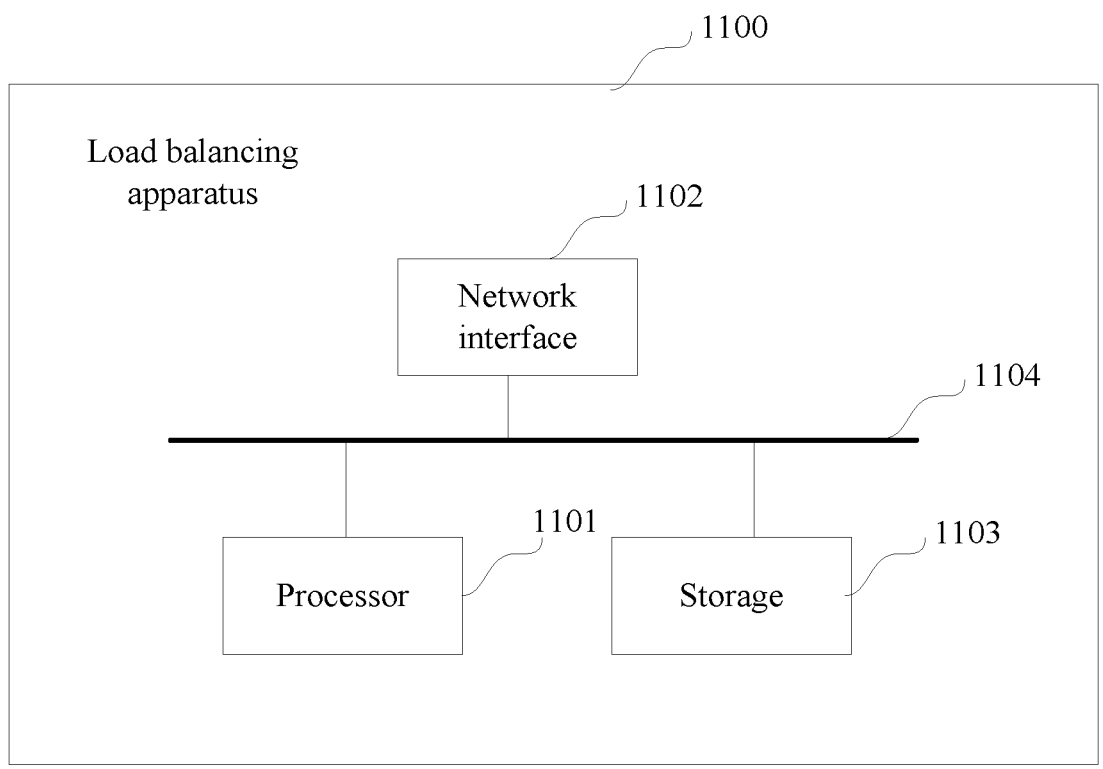
FIG. 11 is a schematic diagram of hardware configuration of a load balancing apparatus according to an embodiment of the present invention.

Based on the load balancing apparatus provided in the above embodiment, an embodiment of the present invention further provides a load balancing apparatus. FIG. 11 is a hardware architecture diagram 1100 of a load balancing apparatus according to the embodiment of the present invention. The load balancing apparatus includes at least one processor 1101 (e.g. a CPU), at least one network interface 1102 or some other types of communication interface, a storage 1103 and at least one communication bus 1104 for implementing connection and communication among the foregoing parts.

The processor 1101 is configured to perform various functions of the determination unit 1001 and execution unit 1002 in FIG. 10, usually under the control of one or more software programs. The one or more software programs for implementing various functions of the determination unit 1001 and execution unit 1002 are stored in the storage 1103, and will be called to the processor 1101 to accomplish the above procedure by the processor 1101 under the control of the processor 1101 when the processor 1101 needs to perform the above procedure. Certainly, the processor 1101 may also perform the above procedure using hardware, which will not be defined in the embodiment of the present invention.

In an embodiment of the present invention, the load balancing apparatus communicates with at least one other communication network element through the at least one network interface 1102 in order to exchange information.

In the load balancing apparatus provided in the embodiment of the present invention, a determination unit determines a load balancing policy according to entity information about each of the service function execution entities in the network service system, the execution unit generates an execution flow table according to the load balancing policy, and controls a network device to perform a load balancing operation according to the execution flow table. That is, the load balancing policy in the embodiment of the present invention is determined according to the entity information about each of the service function execution entities in the network service system, thus an execution flow table is generated according to the actual condition (in transparent mode or non-transparent mode) of each of the service function execution entities in the network service system and based on the load balancing policy. The network device is controlled to perform the load balancing operation based on the execution flow table, hence eliminating the need for any specialized load balancing devices to act as proxies forwarding data flow packets, thereby avoiding modifying the destination MAC address and destination IP address of data flows in transparent mode. That is, the load balancing method provided in the present invention is applicable to network service systems that include service function execution entities in transparent mode, and can improve the accuracy of load balancing.

Figure 12:
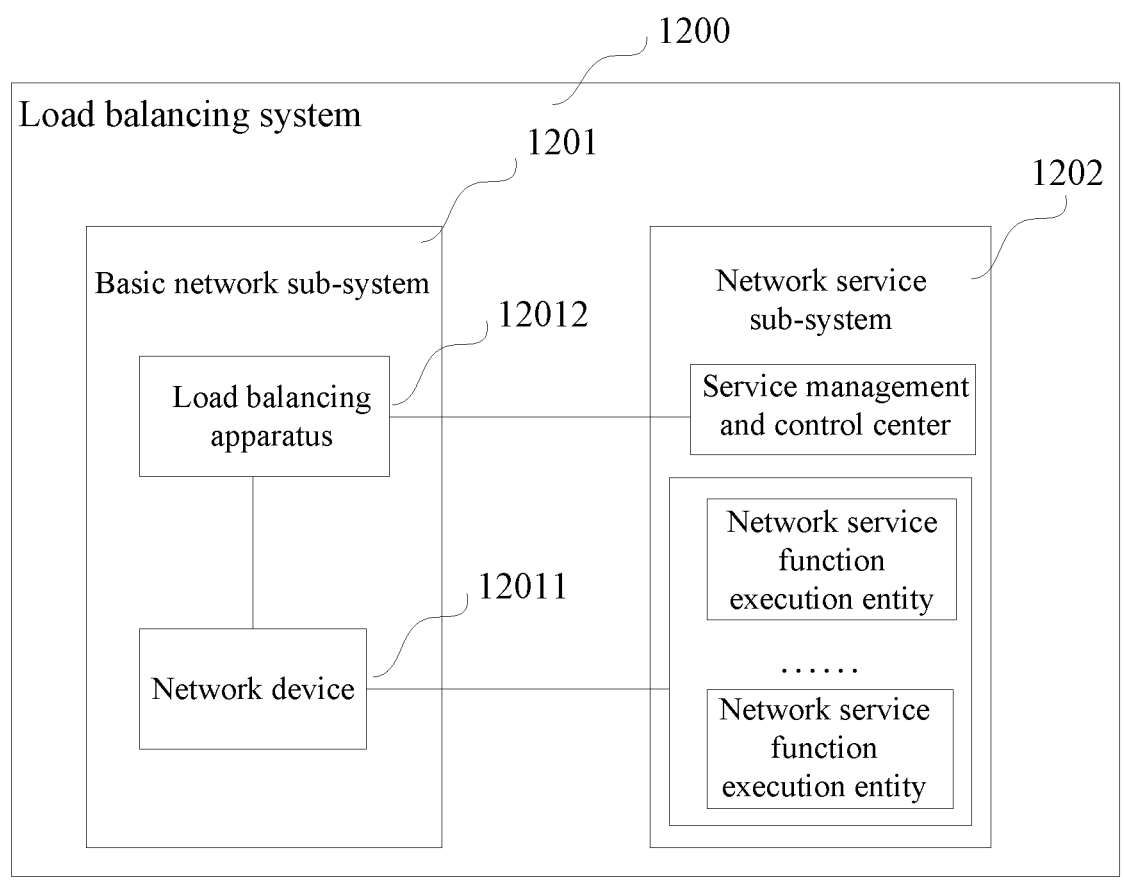
FIG. 12 is a schematic architectural diagram of a load balancing system according to an embodiment of the present invention.

Based on the load balancing method and the load balancing apparatus provided in the above embodiment, an embodiment of the present invention further provides a load balancing system 1200. As shown in FIG. 12, the system includes a basic network sub-system 1201 and a network service sub-system 1202, wherein:

the basic network sub-system 1201 includes a network device 12011 and a load balancing apparatus 12012 involved in the above embodiment, and the network service sub-system 1202 includes a service management and control center and at least two service function execution entities.

the load balancing apparatus 12012 in the basic network sub-system 1201 interacts with the service management and control center in the network service sub-system, and determines a load balancing policy based on entity information about each of the service function execution entities in the network service sub-system 1202, generates an execution flow table recording load allocation information and flow persistence information, and delivers the execution flow table to the network device 12011. The network device 12011 performs a load allocation operation for each of the service function execution entities in the network service sub-system 1202 according to the load allocation information, and performs a flow persistence operation for each of the service function execution entities in the network service sub-system 1202 according to the flow persistence information.

In the load balancing system provided in the embodiment of the present invention, the load balancing apparatus determines a load balancing policy according to entity information about each of the service function execution entities of the network service sub-system, and generates an execution flow table based on the load balancing policy; and the network device performs load balancing operation according to the execution flow table. That is, the load balancing policy in the embodiment of the present invention is determined by the basic network sub-system according to entity information about each of the service function execution entities of the network service sub-system. Such a load balancing policy determined by interacting with the network service sub-system can allow for a corresponding load balancing policy process adaptable to the network service sub-system based on the actual condition (in transparent mode or non-transparent mode) of each service function execution entity of the network service sub-system while ensuring that no service function execution entity in transparent mode is disrupted, thereby improving the accuracy of load balancing.

Apparently, those skilled in the art may make various modifications and variations to the invention without departing from the spirit and scope of the invention. Thus, the invention intends to include these modifications and variations if they belong to the scope of the invention and the equivalent technology thereof.

What is claimed is:

1. A load balancing method, comprising:
    interacting, by a network management and control center of a basic network system, with a service management and control center of a network service system, and determining a load balancing policy according to entity information about service function execution entities in the network service system, wherein the basic network system comprises a network device comprising at least one of a router, a switch and a server functioning as a router or a switch, and the network management and control center configured to manage and control the network device, and wherein the network service system comprises the service function execution entities distributed on different servers and the service management and control center configured to manage and control each service function execution entity in the network service system;
    generating, by the network management and control center, an execution flow table according to the load balancing policy; and
    delivering, by the network management and control center, the execution flow table to the network device, to instruct the network device to perform a load balancing operation according to the execution flow table;
    wherein, the interacting, by the network management and control center of the basic network system, with the service management and control center of the network service system, and determining the load balancing policy according to the entity information about the service function execution entities in the network service system comprises:
    acquiring, by the network management and control center, the entity information about the service function execution entities collected by the service management and control center, and generating a load balancing policy, wherein the entity information comprises address information, service state persistence information and load status information of each service function execution entity, and the load balancing policy comprises a flow persistence suggestion and a load allocation weight suggestion corresponding to the address information according to the service state persistence information and the load status information; and
    wherein the load allocation weight suggestion is configured to indicate a weight ratio of data traffic to be allocated to each service function execution entity, wherein a larger weight ratio is assigned to a service function execution entity currently having a lower load and a smaller weight ratio is assigned to a service function execution entity currently having a higher load, and the flow persistence refers to sending all data flows which belong to the same service to the same service function execution entity undergoing service state persistence.

2. The method according to claim 1, wherein, the generating, by the network management and control center, the execution flow table according to the load balancing policy comprises:
    generating, by the network management and control center, an execution flow table recording load allocation information and flow persistence information based on the load allocation weight suggestion and the flow persistence suggestion; and
    wherein the delivering, by the network management and control center, the execution flow table to the network device, to instruct the network device to perform the load balancing operation according to the execution flow table comprises:
    delivering, by the network management and control center, the execution flow table to the network device, to instruct the network device to perform a load allocation operation based on the load allocation information in the execution flow table, and to perform a flow persistence operation according to the flow persistence information in the execution flow table.

3. The method according to claim 2, wherein, the generating the execution flow table recording the load allocation information and the flow persistence information comprises:
    generating an execution flow table recording a two-way flow allocation suggestion and a two-way flow persistence suggestion, wherein the two-way flow allocation suggestion is configured to instruct that two data flows mutually forming a two-way flow are allocated to the same service function execution entity, and the two-way flow persistence suggestion is configured to instruct that a two-way flow persistence operation is performed on the service function execution entity to which the two-way flow is allocated.

4. The method according to claim 2, further comprising:
    controlling, by the network management and control center, the network device to generate a flow log table recording flow allocation information and flow persistence information;
    instructing, by the network management and control center, the network device to perform a load allocation operation and a flow persistence operation for a data packet from a client based on the flow log table; and
    instructing, by the network management and control center, the network device to swap a source address of a data packet from a server with a destination address thereof, and then perform the load allocation operation and the flow persistence operation according to the flow log table.

5. The method according to claim 2, further comprising:
    upon determining, by the network management and control center, that a new service function execution entity is added to a network service system, allocating data flows other than those undergoing flow persistence operation among original service function execution entities and the newly added service function execution entity according to the load allocation weight suggestion, while continuing to allocate data flows undergoing flow persistence operation to the original service function execution entities.

6. The method according to claim 1, wherein, the network service system is a network function virtualization (NFV) system, and the service management and control center comprised in the network service system is a NFV management and control center, and the service function execution entities comprised in the network service system are virtual network function (vNF) entities.

7. The method according to claim 1, wherein, at least one of the service functioning execution entities is in transparent mode.

8. A load balancing apparatus, comprising a processor, a network interface, a memory and a communication bus configured to connect the processor, the network interface and the memory, wherein the memory is configured to store instructions, that when executed by the processor, cause the processor to perform a method comprising:
   interacting with a service management and control center of a network service system, determining a load balancing policy according to entity information about service function execution entities in the network service system, and sending the determined load balancing policy to the execution unit;
   receiving the load balancing policy sent by the determination unit, generating an execution flow table according to the load balancing policy; and
   delivering the execution flow table to a network device, to instruct the network device to perform a load balancing operation according to the execution flow table;
   wherein, the interacting with the service management and control center of the network service system, and determining the load balancing policy according to the entity information about the service function execution entities in the network service system comprises:
   acquiring the entity information about the service function execution entities collected by the service management and control center, and generating a load balancing policy, wherein the entity information comprises address information, service state persistence information and load status information of each service function execution entity, and the load balancing policy comprises a flow persistence suggestion and a load allocation weight suggestion corresponding to the address information according to the service state persistence information and the load status information; and
   wherein the load allocation weight suggestion is configured to indicate a weight ratio of data traffic to be allocated to each service function execution entity, wherein a larger weight ratio is assigned to a service function execution entity currently having a lower load and a smaller weight ratio is assigned to a service function execution entity currently having a higher load, and the flow persistence refers to sending all data flows which belong to the same service to the same service function execution entity undergoing service state persistence.

9. The load balancing apparatus according to claim 8, wherein, the generating the execution flow table according to the load balancing policy comprises:
   generating an execution flow table recording load allocation information and flow persistence information based on the load allocation weight suggestion and the flow persistence suggestion; and
   wherein the delivering the execution flow table to the network device, to instruct the network device to perform the load balancing operation according to the execution flow table comprises:
   delivering the execution flow table to the network device, to instruct the network device to perform a load allocation operation based on the load allocation information in the execution flow table, and to perform a flow persistence operation according to the flow persistence information in the execution flow table.

10. The load balancing apparatus according to claim 9, wherein, the generating the execution flow table recording the load allocation information and the flow persistence information comprises:
    generating an execution flow table recording a two-way flow allocation suggestion and a two-way flow persistence suggestion, wherein the two-way flow allocation suggestion is configured to instruct that two data flows mutually forming a two-way flow are allocated to the same service function execution entity, and the two-way flow persistence suggestion is configured to instruct that a two-way flow persistence operation is performed on the service function execution entity to which the two-way flow is allocated.

11. The load balancing apparatus according to claim 9, wherein, the method further comprising:
    controlling the network device to generate a flow log table recording flow allocation information and flow persistence information,
    instructing the network device to perform the load allocation operation and the flow persistence operation for a data packet from a client based on the flow log table, and
    instructing the network device to swap a source address of a data packet from a server with a destination address thereof, and then perform the load allocation operation and the flow persistence operation according to the flow log table.

12. The load balancing apparatus according to claim 9, wherein, the method further comprising:
    determining whether a new service function execution entity is added to a network service system, and upon determining that the new service function execution entity is added to the network service system,
    allocating data flows other than those undergoing flow persistence operation among original service function execution entities and the newly added service function execution entity according to the load allocation weight suggestion, while continuing to allocate data flows undergoing flow persistence operation to the original service function execution entities.

13. A load balancing system, comprising a basic network sub-system and a network service sub-system, wherein:
    the basic network sub-system comprises a network device comprising at least one of a router, a switch and a server functioning as a router or a switch and a load balancing apparatus, and the network service sub-system comprises a service management and control center and at least two service function execution entities,
    the load balancing apparatus in the basic network sub-system is configured to: interact with the service management and control center in the network service sub-system, determine a load balancing policy based on entity information about each of the service function execution entities in the network service sub-system, generate an execution flow table according to the load balancing policy, and deliver the execution flow table to the network device to instruct the network device to perform a load balancing operation according to the execution flow table;
    the load balancing apparatus is further configured to: acquire the entity information about the service function execution entities collected by the service management and control center, and to generate a load balancing policy, wherein the entity information comprises address information, service state persistence information and load status information of each service function execution entity, and the load balancing policy comprises a flow persistence suggestion and a load allocation weight suggestion corresponding to the address information according to the service state persistence information and the load status information; and the load allocation weight suggestion is configured to indicate a weight ratio of data traffic to be allocated to each service function execution entity, wherein a larger weight ratio is assigned to a service function execution entity currently having a lower load and a smaller weight ratio is assigned to a service function execution entity currently having a higher load, and the flow persistence refers to sending all data flows which belong to the same service to the same service function execution entity undergoing service state persistence.

14. The load balancing system according to claim 13, wherein the load balancing apparatus is further configured to generate an execution flow table recording load allocation information and flow persistence information based on the load allocation weight suggestion and the flow persistence suggestion; and wherein the load balancing apparatus is further configured to deliver the execution flow table to the network device, to instruct the network device to perform a load allocation operation based on the load allocation information in the execution flow table, and to perform a flow persistence operation according to the flow persistence information in the execution flow table.

15. The load balancing system according to claim 14, wherein the load balancing apparatus is further configured to generate an execution flow table recording a two-way flow allocation suggestion and a two-way flow persistence suggestion, wherein the two-way flow allocation suggestion is configured to instruct that two data flows mutually forming a two-way flow are allocated to the same service function execution entity, and the two-way flow persistence suggestion is configured to instruct that a two-way flow persistence operation is performed on the service function execution entity to which the two-way flow is allocated.

16. The load balancing system according to claim 14, wherein the load balancing apparatus is further configured to control the network device to generate a flow log table recording flow allocation information and flow persistence information; instruct the network device to perform a load allocation operation and a flow persistence operation for a data packet from a client based on the flow log table; and instruct the network device to swap a source address of a data packet from a server with a destination address thereof, and then perform the load allocation operation and the flow persistence operation according to the flow log table.

17. A load balancing method, comprising:

interacting, by a network management and control center of a basic network system, with a service management and control center of a network service system, and determining a load balancing policy according to entity information about service function execution entities in the network service system, wherein the basic network system comprises a network device comprising at least one of a router, a switch and a server functioning as a router or a switch, and the network management and control center configured to manage and control the network device, and wherein the network service system comprises the service function execution entities distributed on different servers and the service management and control center configured to manage and control each service function execution entity in the network service system;

generating, by the network management and control center, an execution flow table according to the load balancing policy; and delivering, by the network management and control center, the execution flow table to the network device to instruct the network device to perform a load balancing operation according to the execution flow table;

wherein, the interacting, by the network management and control center of the basic network system, with the service management and control center of the network service system, and determining the load balancing policy according to the entity information about the service function execution entities in the network service system comprises:

acquiring, by the network management and control center, a load balancing suggestion generated by the service management and control center based on the entity information about the service function execution entities, and taking the load balancing suggestion as the load balancing policy, wherein the entity information comprises address information, service state persistence information and load status information of each service function execution entity, and the load balancing suggestion comprises a flow persistence suggestion and a load allocation weight suggestion for the service function execution entity corresponding to each address; and wherein the load allocation weight suggestion is configured to indicate a weight ratio of data traffic to be allocated to each service function execution entity, wherein a larger weight ratio is assigned to a service function execution entity currently having a lower load and a smaller weight ratio is assigned to a service function execution entity currently having a higher load, and the flow persistence refers to sending all data flows which belong to the same service to the same service function execution entity undergoing service state persistence.

18. A load balancing apparatus, comprising a processor, a network interface, a memory and a communication bus configured to connect the processor, the network interface and the memory, wherein the memory is configured to store instructions that when executed by the processor, cause the processor to perform a method comprising:

interacting with a service management and control center of a network service system, determining a load balancing policy according to entity information about service function execution entities in the network service system, and sending the determined load balancing policy to the execution unit;

receiving the load balancing policy sent by the determination unit, generating an execution flow table according to the load balancing policy; and delivering the execution flow table to a network device to instruct the network device to perform a load balancing operation according to the execution flow table;

wherein, the interacting with the service management and control center of the network service system, and determining the load balancing policy according to the entity information about the service function execution entities in the network service system comprises:

acquiring a load balancing suggestion generated by the service management and control center based on the entity information about the service function execution entities, and taking the load balancing suggestion as the load balancing policy, wherein the entity information comprises address information, service state persistence information and load status information of each service function execution entity, and the load balancing suggestion comprises a flow persistence suggestion and a load allocation weight suggestion for the service function execution entity corresponding to each address; and wherein the load allocation weight suggestion is configured to indicate a weight ratio of data traffic to be allocated to each service function execution entity, wherein a larger weight ratio is assigned to a service function execution entity currently having a lower load and a smaller weight ratio is assigned to a service function execution entity currently having a higher load, and the flow persistence refers to sending all data flows which belong to the same service to the same service function execution entity undergoing service state persistence.

19. A load balancing system, comprising a basic network sub-system and a network service sub-system, wherein:

the basic network sub-system comprises a network device comprising at least one of a router, a switch and a server functioning as a router or a switch and a load balancing apparatus, and the network service sub-system comprises a service management and control center and at least two service function execution entities;

the load balancing apparatus in the basic network sub-system is configured to: interact with the service management and control center in the network service sub-system, determine a load balancing policy based on entity information about each of the service function execution entities in the network service sub-system, generate an execution flow table according to the load balancing policy, and deliver the execution flow table to the network device to instruct the network device to perform a load balancing operation according to the execution flow table;

the load balancing apparatus is further configured to: acquire a load balancing suggestion generated by the service management and control center based on the entity information about the service function execution entities, and take the load balancing suggestion as the load balancing policy, wherein the entity information comprises address information, service state persistence information and load status information of each service function execution entity, and the load balancing suggestion comprises a flow persistence suggestion and a load allocation weight suggestion for the service function execution entity corresponding to each address; and the load allocation weight suggestion is configured to indicate a weight ratio of data traffic to be allocated to each service function execution entity, wherein a larger weight ratio is assigned to a service function execution entity currently having a lower load and a smaller weight ratio is assigned to a service function execution entity currently having a higher load, and the flow persistence refers to sending all data flows which belong to the same service to the same service function execution entity undergoing service state persistence.

* * * * *